Patented Nov. 17, 1931

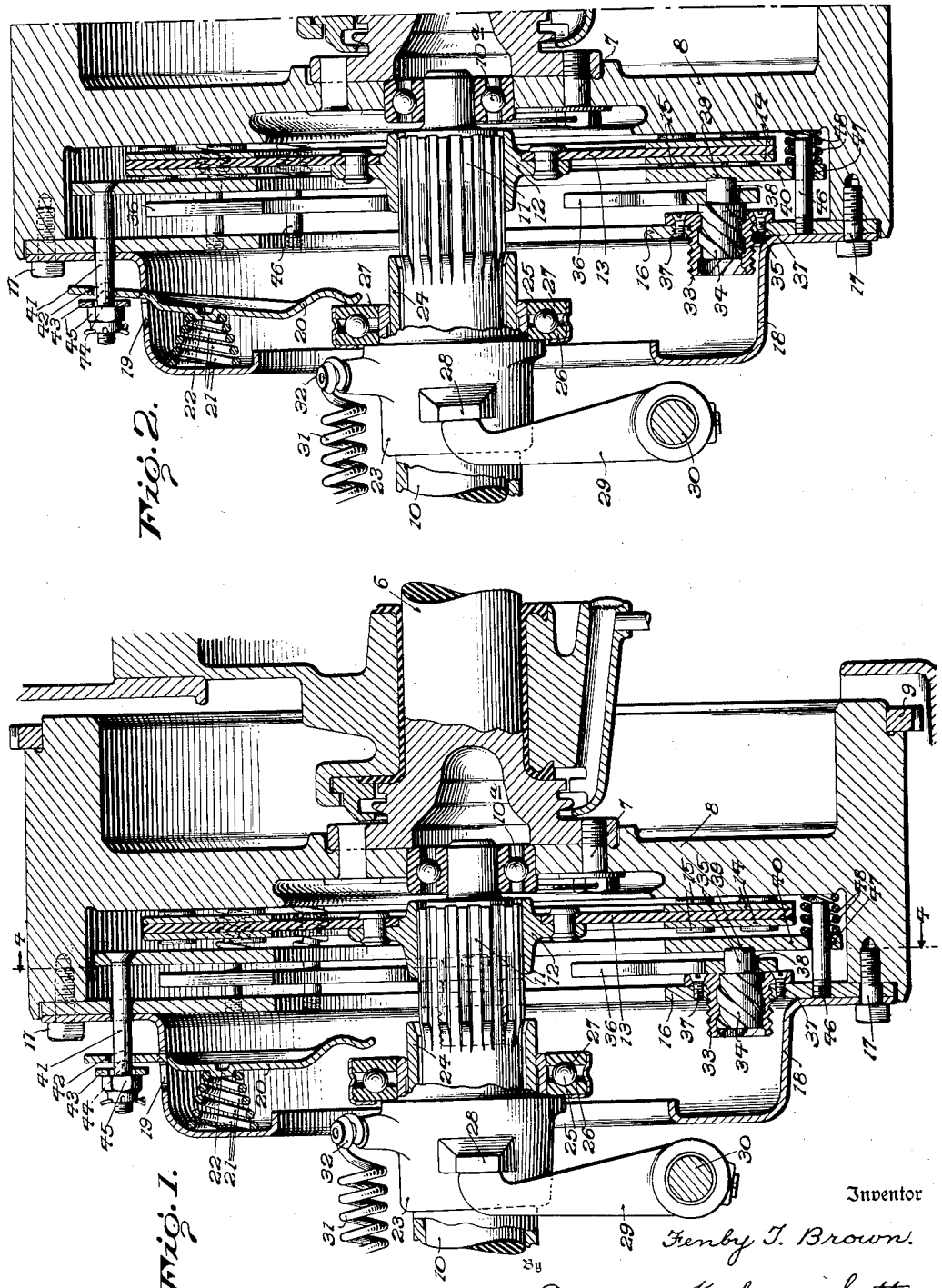

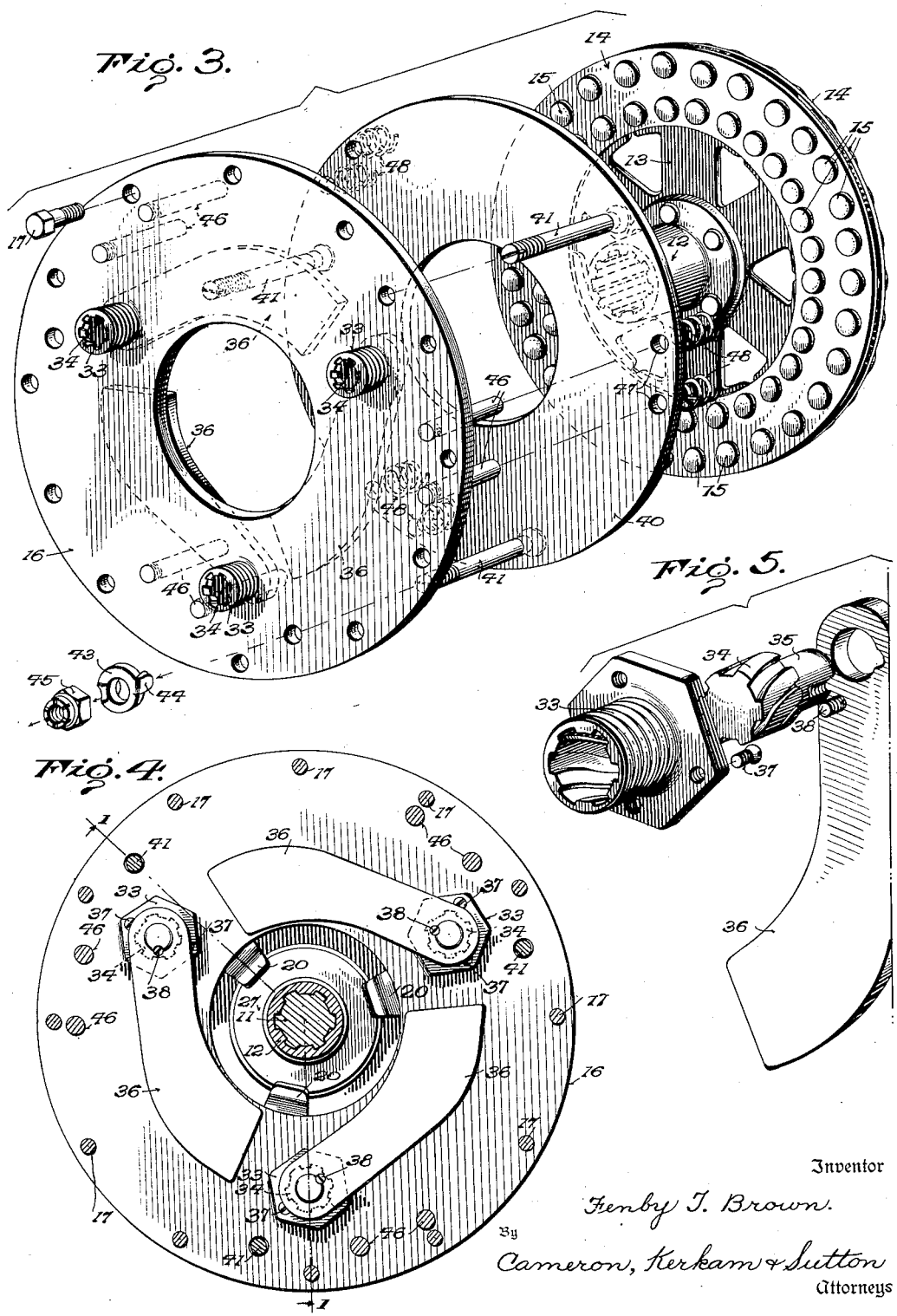

1,832,526

UNITED STATES PATENT OFFICE

FENBY T. BROWN, OF BALTIMORE, MARYLAND, ASSIGNOR TO INVESTORS INDUSTRIES, INC., OF BALTIMORE, MARYLAND, A CORPORATION OF MARYLAND

CLUTCH

Application filed January 20, 1931. Serial No. 509,972.

This invention relates to clutches, and more particularly to clutches of the type adapted for use with motored vehicles such as automobiles and airplanes.

One of the objects of the invention is to provide an automatically operated clutch of simple and novel construction whereby the speed of the driving member automatically controls the operation of the clutch unit.

Another object is to provide a novel automatically operated clutch which is simple in construction, inexpensive of manufacture, and which may be readily substituted for all or a portion of any of the ordinary manually operated clutches with which motored vehicles are usually equipped.

A further object is to provide a novel clutch mechanism normally automatic in its operation but which is also capable of manual control at the will of the operator.

Still another object is to provide an automatically operated clutch wherein a novel combination of centrifugally actuated means and screw and nut means accurately and efficiently controls the action of the clutch in direct relation to the speed of the driving member.

A still further object is to provide an automatically operated clutch which may be manufactured as an accessory, and quickly and easily attached to a motored vehicle in place of the usual manually operated clutch, and without the necessity of any reorganization or other changes in the parts of the power plant of the vehicle.

These and other objects will appear more fully from a consideration of the detailed description of the invention which follows.

Although only one embodiment of the invention is described and illustrated in the accompanying drawings, it is to be expressly understood that these drawings are for the purpose of illustration only and are not to be construed as a limitation of the scope of the invention, reference being had for this purpose to the appended claims.

In the drawings:

Fig. 1 is a sectional view, taken on line 1—1 of Fig. 4 with certain parts shown in full, of one embodiment of the present invention showing the clutch in released position;

Fig. 2 is a sectional view similar to that of Fig. 1 but showing the clutch in engaged position;

Fig. 3 is a drawn-out perspective view of certain of the parts of the clutch shown in Fig. 1;

Fig. 4 is a sectional view taken on line 4—4 of Fig. 1; and

Fig. 5 is a drawn-out perspective view of the centrifugally operated screw and nut means whereby the clutch is automatically operated.

Referring now to the drawings, wherein like reference characters indicate like parts throughout the several views, there is disclosed in Figs. 1 and 2 a clutch between a driving shaft and a driven shaft which is adapted to be normally operated automatically in accordance with the speed of the driving shaft by means of a novel centrifugally actuated screw and nut device, and yet to be capable of manual operation also at the will of the operator.

In the embodiment shown, the driving member 6 may be the engine crank shaft of any type of motored vehicle, to which is secured in the usual manner, as by bolts 7, a fly-wheel 8 provided with the usual starting gear 9. The driven member 10 may be the main drive shaft leading aft to the change gear transmission of the vehicle, which is journaled at its forward end in a suitable bearing 10a housed in flywheel 8 and provided with a splined portion 11 on which is mounted for rotation therewith and longitudinal movement relative thereto the hub 12 of a friction disk 13. The latter is provided at its outer portion with a pair of annular friction rings 14, the faces of which are lined with any suitable friction material. Although any of the usual commercial clutch facings may be employed, it has been found that the optimum results in durability and efficiency of operation are obtained when buttons 15 made of a self-lubricating mixture of carbon and graphite and compressed under great pressure are mounted on the faces of rings 14 by any suitable means such as recesses into which the bottoms of said buttons are pressed.

The splined mounting of friction disk 13 on driven shaft 11 allows a slight longitudinal movement of said disk so that it may be forced to the right, as viewed in Fig. 1, by means later to be described, into frictional engagement with the after face of flywheel 8 and thereby couple the driving shaft to the driven shaft, or it may occupy a released position, as shown in Fig. 1, where there is no frictional engagement but full slippage between disk 13 and the flywheel 8, at which time the clutch is fully disengaged. The amount of torque transmitted through this clutch will depend upon the force with which friction disk 13 is urged into engagement with the face of flywheel 8, and it is this force which, by means later to be described, is controlled in accordance with the speed of rotation of driving shaft 6.

The means for generating this clutch pressure comprises a novel combination of centrifugally actuated and screw and nut devices which are compactly mounted in a manner to facilitate easy attachment to the flywheel and to enable the continuation of the use of a portion of the manual clutch controlling means. In the form shown, an annular base plate 16 is secured to the after face of flywheel 8 by suitable screws 17, which screws may be the same ones which normally fasten the outer retaining plate 18 of the usual manually operated clutch mechanism to the flywheel. Outer retaining plate 18 is annular and cup-shaped in form, and is provided with a plurality of openings 19 spaced about its periphery in which are pivotally mounted clutch release levers 20. The inner ends of release levers 20 are normally urged forward, or to the right as viewed in Fig. 1, by suitable resilient means, such as conically coiled springs 21, seated against plate 18 and exerting their thrust against release levers 20 intermediate the pivot points of the latter in openings 19 and their inner ends. Springs 21 are maintained in their proper position due to their engagement with punched-out projections 22 formed on levers 20.

Means are also provided for positively moving the inner ends of release levers 20 forwardly, or to the right as viewed in Fig. 1, said means comprising a throw-out collar 23 slidable on a sleeve 24 which surrounds but is out of contact with driven shaft 10. The collar 23 is provided at its forward end with a ball bearing 25, the inner race 26 of which is carried by the collar and the outer race 27 of which is adapted to engage the inner ends of release levers 20. Collar 23 is also socketed as at 28 at diametrically opposite points for the reception of the extremities of the arms of a fork 29 which is secured for oscillatory movement on a transverse shaft 30 with which the usual clutch release pedal is connected. A coil spring 31 is also secured to collar 23 as at 32 for returning said collar to its normal position (as shown in Figs. 1 and 2) when the operator's foot is removed from the clutch release pedal.

It will be noted that the structure thus described, comprising outer retaining plate 18, release levers 20, and throw-out collar 23 with its associated parts, is standard equipment on a well known type of automobile, thereby illustrating the adaptability of the present clutch to existing installations.

Referring now more particularly to the means for automatically controlling the frictional engagement between friction disk 13 and the face of flywheel 8, shown best in Figs. 3-5, base plate 16 carries a plurality of internally threaded bushings or nut members 33 within which are housed externally threaded shafts or screw members 34. The forward end of each screw member is cylindrical in shape and reduced in size to form a shouldered extension 35 to which may be secured the smaller end of a weighted lever arm 36. Bushings or nut members 33 are externally threaded for engagement with base plate 16 and are secured thereto against possible rotation by screws 37. Weighted arms 36 are fixedly secured to shafts or screw members 34 by screws 38 which engage both of the members thus connected. The forward end of each shaft or screw member 34 projects beyond the face of weighted lever arm 36 for engagement with a recess 39 formed in a clutch operating plate later to be described, thus preventing any possible distortion of the axis of screw member 34 due to the centrifugal action of lever arm 36.

In the form shown, there are three sets of centrifugally actuated screw and nut means uniformly spaced about base plate 16, and, although this is the preferred embodiment, it will be understood that various numbers of these devices may be utilized. The patch of the cooperating threads of screw members 34 and nut members 33, and the size and weight of lever arms 36 are dependent upon the power to be transmitted through the clutch and other operating conditions peculiar to each installation, but it is to be noted that by this novel combination of elements, efficient automatic operation of the clutch can be obtained with much lighter parts than is possible with known devices of this general character, since a very slight rotational movement of screw member 34 due to centrifugal action of lever arm 36 produces a comparatively substantial movement or force in an axial direction.

As previously described, friction disk 13 is splined to driven shaft 10 so as to be capable of a small longitudinal movement relative thereto, and its normal at-rest position is such that there is no frictional engagement with the face of flywheel 8. To engage the clutch so as to couple the driving member to the driven member, suitable means are provided for moving friction disk 13 to the right, as viewed in Fig. 1, so as to bring it into frictional engagement with the flywheel. In the form shown, a clutch operating plate 40 is floatingly mounted between the forward faces of weighted arms 36 and the after friction ring 14 of friction disk 13, so as to be capable of longitudinal or axial movement relative to driven shaft 10 and the other parts of the clutch mechanism.

Operating plate 40 is provided at spaced points about its periphery with a plurality of studs 41 which project aft from said plate, pass freely through suitable openings in base plate 16 and outer retaining plate 17, and thence through openings 42 in the outer ends of release levers 20, the extremities of studs 41 being provided with washers 43 having forwardly projecting ears 44 adapted to engage corresponding punched-out depressions formed in the after faces of release levers 20 at diametrically opposite points around openings 42, and nuts 45 which are threaded thereon and bear against washers 43.

Base plate 16 is also provided with means for guiding operating plate 40 in its longitudinal or axial movements and for relieving studs 41 of some of the shearing stresses incident to the rapid rotation to which the clutch parts are subjected during operation, said means comprising a plurality of studs 46 threaded into base plate 16 and projecting forwardly therefrom through suitable openings 47 formed in operating plate 40. Studs 46 are also extended beyond the forward face of operating plate 40 so as to form means for maintaining a plurality of clutch release springs 48 in spaced relation around the periphery of clutch operating plate 40. Springs 48 are interposed between the forward face of flywheel 8, outside of the periphery of friction disk 13, and tend to force operating plate 40 to the left, as viewed in Fig. 1, so as to release the frictional clutching engagement between forward friction ring 14 and flywheel 8. These springs 48 may be dispensed with, if desired, provided springs 21 are sufficiently strong to return operating plate 40 to released position when driving shaft 6 is reduced to idling speed.

The operation of the device is as follows: When the driving member 6 is at rest, or rotating only at its predetermined idling speed, the parts of the clutch mechanism occupy the position indicated in Fig. 1. As shown therein, clutch operating plate 40 is forced to the left out of engagement with after friction ring 14 by means of the combined forces of springs 21 and 48 and there is therefore no frictional engagement between forward friction ring 14 and the face of flywheel 8.

Should driving shaft 6 be rotating at idling speed, it will be understood that base plate 16 and the parts mounted thereon, including clutch operating plate 40, are rotating with flywheel 8, and that full slippage is occurring between the forward friction ring 14 and the face of the flywheel, driven shaft 10 consequently remaining at rest. It will also be understood that weighted arms 36 and the cooperating threads of shafts 34 and nuts 33 are so designed that at idling speed the centrifugal force developed is insufficient to throw said arms outward from their at-rest position far enough to cause operating plate 40 to be moved into engagement with after friction ring 14 of friction disk 13. The clutch release levers 20 are maintained in the substantially vertical position shown by the action of springs 21, and as long as the operator's foot does not depress the clutch pedal, throw-out collar 23 and its associated parts will maintain the position shown in Fig. 1 under the action of spring 31.

In normal operation, with throw-out collar 23 in the position shown in Fig. 1, when driving shaft 6 is speeded up beyond idling speed, the weighted ends of levers 36 gradually move outwardly from their inner, at-rest positions and in so doing rotate shafts 34 within nuts 33. As previously mentioned, the pitch of the cooperating threads of these two members is so designed that a very slight rotational movement of shafts 34 produces a comparatively substantial axial movement of said shafts to the right, and, through the contact between the forward ends of said shafts and the after face of operating plate 40, forces the latter to the right into engagement with after friction ring 14 of friction disk 13, thereby effecting frictional engagement between the forward friction ring of said friction disk and the after face of flywheel 8. The frictional pressure thus developed creates a driving engagement between driving shaft 6 and driven shaft 10, the amount of torque transmitted between these two members being proportional to the pressure created at the frictional engaging surfaces. This pressure is in turn dependent upon the amount of outward movement of weighted arms 36, which movement is directly proportional to the speed of rotation of base plate 16 which is the same as that of driving shaft 6. It will therefore be seen that the clutching action between friction disk 13 and flywheel 8 is truly automatic and varies according to the speed of rotation of driving shaft 6.

As the speed of driving shaft 6 increases, and clutch operating plate 40 is moved to the right, as indicated in Fig. 2, release levers 20 are oscillated about their fulcrums in opening 19 due to the force exerted on their outer ends through washers 43, springs 21 are compressed, and the inner ends of said release levers approach throw-out collar 23. The position shown in Fig. 2 illustrates the fully engaged position of the clutch at which time the inner ends of release levers 20 are in contact with outer races 27.

If during such conditions of operation with the clutch engaged and driven shaft 10 being rotated, it is desired to disengage the clutch, as for instance to change gears in the case of an automobile, the desired result may be accomplished in one of two ways. If the speed of the driving shaft is to be maintained without change, the clutch may be disengaged manually by a slight pressure on the clutch pedal which moves throw-out collar 23 to the right, as viewed in Fig. 2, thereby, through the oscillation of release levers 20 about their fulcrums in openings 19, drawing clutch operating plate 40 to the left through the force exerted by the outer ends of release levers 20 against washers 42 carried on studs 40, and relieving the pressure exerted on friction disk 13 sufficiently to allow full slippage to occur between forward friction ring 14 and flywheel 8. This movement of clutch operating plate 40 to the left is possible in spite of the resisting force due to centrifugal action of weighted arms 36, because the design of the cooperating threads of shafts 34 and nuts 33 is such as to allow this positive motion of the operating plate 40 to move shafts 34 longitudinally to the left and thereby overcome the centrifugal force exerted upon the weighted arms 36.

If, on the other hand, it is not necessary to maintain the speed of driving shaft 6, the clutch will be automatically disengaged by allowing said driving shaft to drop to idling speed, under which conditions centrifugal force is no longer sufficient to keep weighted arms 36 in their outer positions, and the combined force of springs 48 and 21 is sufficient to move clutch operating plate 40 to the left, and, through its engagement with the ends of shafts 34, return said shafts to their original inner position within nuts 33.

Should it be desired, however, to speed up driving shaft 6 beyond idling speed without moving driven shaft 10, as in warming up the engine, this may be accomplished by the operator manually maintaining the clutch in released position by stepping on the clutch pedal and moving throw-out collar 23 to the right, as viewed in Fig. 1, until outer race 27 of ball bearing 25 abuts the inner ends of release levers 20 and maintains them in the position shown in Fig. 1. Then, even if driving shaft 6 is speeded up, with a consequent tendency of weighted arms 36 to move outwardly under centrifugal force and thus rotate shafts 34, which rotation would be simultaneously transmitted into longitudinal movement to the right of said shafts and would exert a pressure upon operating plate 40 tending to move it to the right, said operating plate will nevertheless be maintained in its released position due to the resistance offered to its movement by the outer ends of release levers 20 exerted against collars 43.

It will thus be seen from the above description that there is provided by this invention a novel automatic clutch for motored vehicles wherein the clutching action is directly and automatically controlled by the speed of rotation of the driving member. The degree of clutching action is accurately maintained proportionate to the speed of the driving member by the novel combination of screw and nut means with centrifugally actuated lever arms. It will be noted that the force transmitted by this novel energy converting means is exerted substantially at a single point which lies on the axis of the screw and nut means, which is also the axis of rotation for the centrifugally actuated arms. The usual defects incident to centrifugally actuated devices due to forces opposing centrifugal force in the same plane therewith are therefore eliminated in the present invention, and the amount of movement of the weighted lever arms, which in turn is converted into axial movement of the screw portion of the screw and nut devices, is maintained accurately proportionate to the speed of the driving means throughout the driving range.

The invention also provides an automatic clutch device which may be manufactured as an accessory and substituted as a unit in any of the usual commercial installations without requiring any special reconstruction of the other parts of the power means. Although the clutch disclosed is capable of full automatic operation, means have also been provided for operating the clutch manually in the usual way. The construction of the entire clutch mechanism is simple and rugged, and is economical of manufacture. Moreover, it may be quickly installed by any mechanic in any of the usual power plants found in motored vehicles.

It will be obvious that the invention is not limited to the form shown in the drawings, but is capable of a variety of mechanical embodiments. For example, any suitable type of clutch disk may be substituted for the specific form shown and described, and other forms of manual clutch releasing means may obviously be employed in place of the well known means illustrated. Various other changes, which will now appear to those skilled in the art, may be made in the from, details of construction and arrangement of the parts without departing from the spirit of the invention, and reference is therefore to be had to the appended claims for a definition of the limits of the invention.

What is claimed is:

1. A clutch comprising a driving member, a driven member, friction members operatively associated with said driving and driven members, a clutch operating plate movable to effect frictional engagement of said friction members, centrifugally actuated screw and nut means for moving said operating plate to effect said frictional engagement, means resiliently opposing said movement, and additional means for positively moving said operating plate in the opposite direction to release said frictional engagement.

2. A clutch comprising a driving member, a driven member, friction members operatively associated with said driving and driven members and adapted for frictional engagement with one another, centrifugally actuated means in operative relation with said driving member, a cooperating screw and nut, means connecting said centrifugally actuated means to one element of said screw and nut means whereby relative axial movement is effected between said screw and said nut, means for transmitting said relative axial movement to one of said friction members for effecting frictional engagement thereof, means resiliently opposing said frictional engagement, and additional means under the control of the operator for releasing said frictional engagement.

3. A clutch comprising a driving member, a driven member, friction members operatively associated with said driving and driven members, a clutch operating plate movable to effect frictional engagement between said friction members, a base plate secured to said driving member, centrifgually actuated screw and nut means carried by said base plate and adapted to move said operating plate to effect said frictional engagement, means resiliently opposing said movement, a plurality of clutch release levers, means passing freely through said base plate for operatively connecting said release levers and said operating plate and means for manually actuating said release levers to positively release said frictional engagement of the friction members.

4. A clutch comprising a driving member, a driven member, a friction disk mounted on said driven member, a clutch operating plate movable to effect frictional engagement between said friction disk and said driving member, a base plate secured to said driving member, a plurality of nut members mounted on said base plate, a screw shaft housed within each of said nut members, a centrifugally actuated lever arm secured to each of said screw shafts, said shafts bearing against said clutch operating plate and under centrifugal movement of said lever arms adapted to move said operating plate toward said friction disk, means resiliently opposing such movement of said operating plate, and additional means for positively moving said operating plate in the opposite direction away from said friction disk.

5. A clutch comprising a driving member, a driven member, a friction disk mounted on said driven member, a clutch operating plate movable to effect frictional engagement between said friction disk and said driving member, a base plate carried by said driving member, centrifugally actuated means mounted on said base plate, means including cooperating screw and nut means for converting the movement of said centrifugally actuated means into movement of said operating plate to effect frictional engagement of said friction disk and driving member, means resiliently opposing said last named movement, a plurality of clutch release levers pivotally mounted in operative relation with said driving member, means passing freely through said base plate for operatively connecting said release levers and said operating plate, and means under the control of the operator for actuating said release levers to positively release the frictional engagement of said friction disk and driving member.

6. In a clutch of the type adapted for drivably connecting a driving member having a flywheel with a driven member, a central recess in said flywheel, a base plate secured to said flywheel and extending across the open end of said recess, a friction disk mounted on said driven member, a clutch operating plate interposed between said base plate and said friction disk, centrifugally actuated screw and nut means for moving said operating plate toward said friction disk for effecting frictional engagement between the latter and said flywheel, means resiliently opposing said movement of said operating plate, said friction disk, operating plate, centrifugally actuated screw and nut means and resilient opposing means all being symmetrically disposed within said recess, manually operable clutch release means carried by said driving member externally of said recess, and means passing freely through said base plate for connecting said release means and said operating plate.

7. In a clutch, a driving member, a driven member and means for automatically effecting a frictional driving engagement between said members in accordance with the speed of rotation of said driving member including a base plate carried by the driving member, a plurality of internally threaded nut members, an externally threaded shaft housed within each of said nut members, a weighted arm secured to each of said shafts, a clutch operating plate mounted for rotation with and axial movement relative to said base plate, one end of each of said shafts having a bearing in said operating plate whereby movement of said weighted arms due to centrifugal force is transmitted by said cooperating shaft and nut means into axial movement of said operating plate, and a friction disc mounted on said driven member and adapted to be moved into frictional engagement with said driving member by said axial movement of said operating plate, said automatically operated means constituting the sole means for effecting said frictional driving engagement.

8. In a clutch, a driving member, a driven member and means for automatically effecting a frictional driving engagement between said members in accordance with the speed of rotation of said driving member including a base plate carried by the driving member, a plurality of internally threaded nut members, an externally threaded shaft housed within each of said nut members, a weighted arm secured to each of said shafts, a clutch operating plate mounted for rotation with an axial movement relative to said base plate, one end of each of said shafts having a bearing in said operating plate whereby movement of said weighted arms due to centrifugal force is transmitted by said cooperating shaft and nut means into axial movement of said operating plate, a friction disc mounted on said driven member and adapted to be moved into frictional engagement with said driving member by said axial movement of said operating plate, said automatically operated means constituting the sole means for effecting said frictional driving engagement, and manually operable means for positively releasing said frictional driving engagement.

In testimony whereof I have signed this specification.

FENBY T. BROWN.